Figure 3:
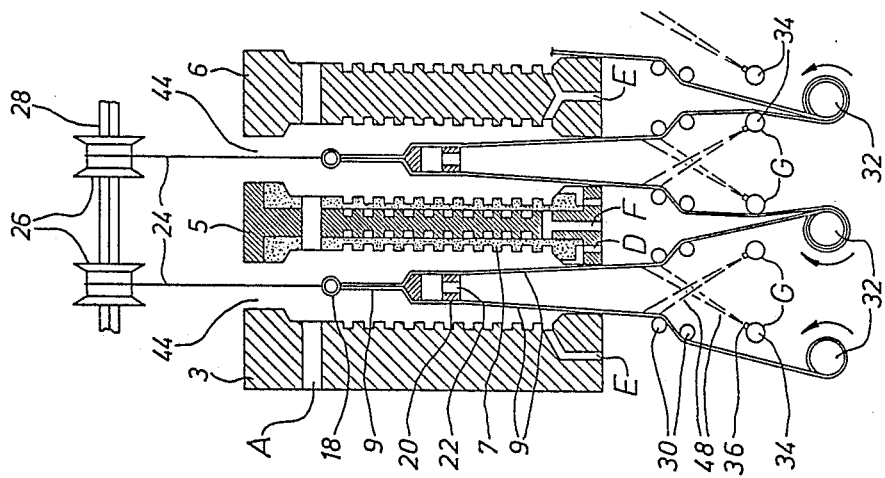

United States Patent [19]

Hedlund et al.

[11] Patent Number: 4,900,454
[45] Date of Patent: Feb. 13, 1990

[54] METHOD AND MEANS FOR PRESSURE FILTERING

[75] Inventors: Hans-Göran Hedlund; Lennart Bäckström, both of Sala, Sweden

[73] Assignee: Sala International AB, Sala, Sweden

[21] Appl. No.: 299,329

[22] PCT Filed: Jul. 6, 1987

[86] PCT No.: PCT/SE87/00321
§ 371 Date: Jan. 6, 1989
§ 102(e) Date: Jan. 6, 1989

[87] PCT Pub. No.: WO88/00495
PCT Pub. Date: Jan. 28, 1988

[30] Foreign Application Priority Data

Jul. 10, 1986 [SE] Sweden ................................. 8603070

[51] Int. Cl.⁴ .............................................. B01D 37/00
[52] U.S. Cl. .................................... 210/770; 210/225; 210/230
[58] Field of Search ........................ 210/225, 230, 770

[56] References Cited

FOREIGN PATENT DOCUMENTS

3527735A1  2/1986  Fed. Rep. of Germany .
3341636C2  7/1986  Fed. Rep. of Germany .
1335850    7/1963  France .
2130911    6/1984  United Kingdom .

OTHER PUBLICATIONS

"Book of Instruction Manual for Kurita Automatic Filter Press, KUF-10", Sep. 1983, Publ. Sala International AB, FIGS. 1-3.

Primary Examiner—Bernard Nozick
Attorney, Agent, or Firm—Dann, Dorfman, Herrell & Skillman

[57] ABSTRACT

Method and apparatus for pressure filtering in a pressure filter (1) comprising a frame carrying press plates (3-6), which can be brought together and apart, said press plates between themselves forming pressure chambers (8). In each pressure chamber there are two filter cloths (9) forming a filter element, said filter cloths being connected to each other in one piece and hanging down from a suspension rod (58) resting on guide rails (86). During operation a suspension of solid particles in a liquid is introduced between the filter cloths (9) in the pressure chambers (8). The liquid is pressed through the filter cloths (9) under the influence of membranes (7) loaded by a pressurized medium and by blowing through a gas and is removed through drain channels (10, 12, 14). The filter cakes (40) remaining between the filter cloths (9) are discharged after bringing apart the press plates (3-6) by vibrating (98) of the filter cloths (9). In order to clean the filter cloths (9) from solid particles remaining thereon pipelike means (106) mounted on a laterally movable drip pan are inserted between the filter cloths (9) and spray downwardly directed spray jets (36, 48) of washing liquid on the filter cloths.

10 Claims, 4 Drawing Sheets

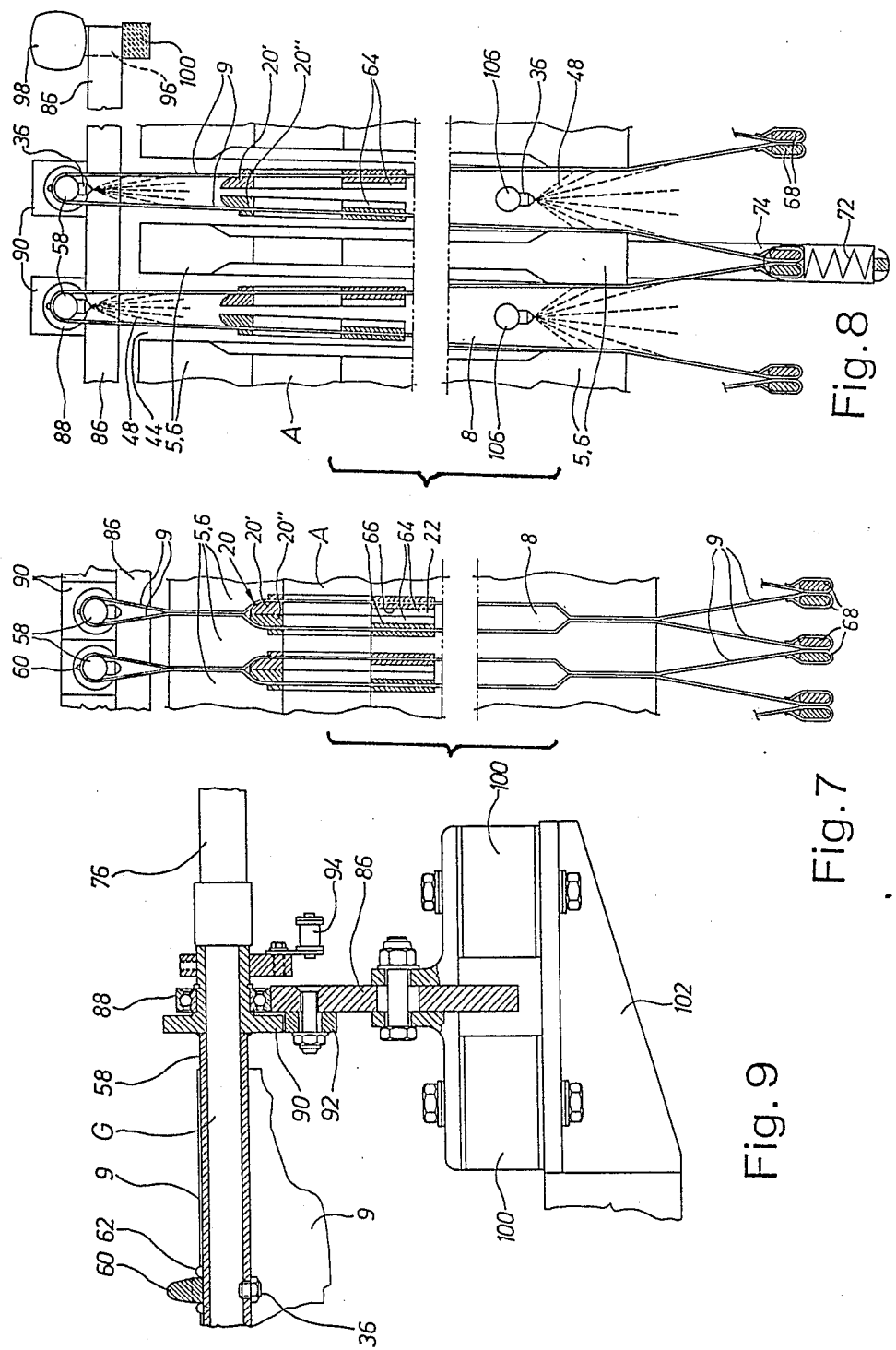

METHOD AND MEANS FOR PRESSURE FILTERING

The present invention relates to a method and means for pressure filtering.

The invention especially relates to the solution of the problem to loosen and discharge the filter cake as well as the washing and cleaning of the filter cloths such a filter.

There are previously known pressure filters, for instance shown German Patent Publication 3.341.636 and 3.527.735, in which the suspension means of the filter cloths in both cases are suspended from the press plates of the pressure filter by protruding, hinged brackets and springs, while the lower ends of the filter cloths are substantially rigidly affixed to the press plates. The filter cloths are vibrated by means of a travelling vibration device, which is acting directly on the suspension rods of the filter cloths. In these previously known devices the filter chambers of the pressure filter are discharged one at a time, which results in very long discharge and cleaning times. Especially during short cycle times and great filter cake capacity this results in uneconomically and unreasonably long discharge times for such a pressure filter. The fixation of the filter cloths in the lower part of the press plates also results in severe strains and increased wear of the filter cloths.

As shown in German Patent Publication 3.527.735 there is also known a pressure filter with a travelling, vertically movable cleaning device, which is cleaning the filter cloths in one filter chamber at a time. This also results in very long cycle times for the filter cloth cleaning operation.

French Patent No. 1.335.850 describes a pressure filter comprising weights at the lower edge of the filter cloths for the tension thereof. However, this filter does not comprise any means for the vibration of the filter cloths. Furthermore, also in this case the cake discharge is effected one filter chamber at a time, which results in the disadvantageous long cycle times mentioned above.

In order to overcome these problems of the Prior Art, a pressure filter has been developed, which is able to discharge the filter cakes in all the filter chambers at the same time and also is able to flush and clean all the filter cloths at the same time. This means of course a considerable improvement compared to the old technique, however, especially for short cycle times and great filter cake capacity, the time used for cake discharge and filter cloth cleaning remains a problem.

Figure 2:
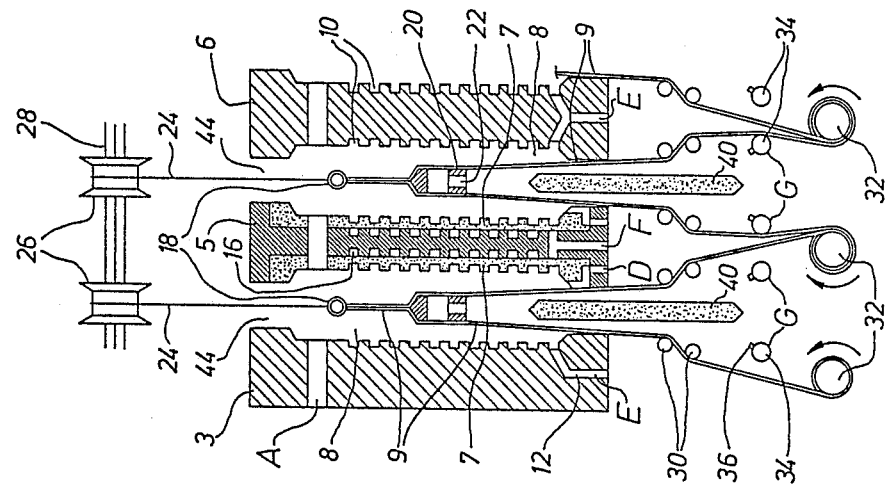
Figure 1:
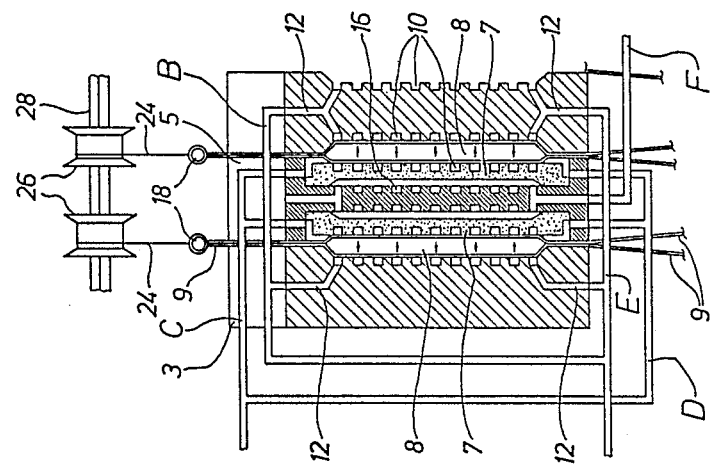

In order to elucidate this previously known pressure filter and the drawbacks and disadvantages thereof reference is made to "Book of Instruction Manual for Kurita Automatic Filter Press, KUF-10", September 1983, published by Sala International AB, Sala, and to the appended FIGS. 1-3, which during various process stages discloses a section of such a filter press, in which section irrelevant components are excluded.

Such a previously known pressure filter comprises a frame 2, (not shown) a stationary end or head plate 3, a movable end or head plate (not shown in FIGS. 1-3), as well as press plates 5, 6 arranged therebetween. At least every second press plate 5 is provided with a membrane 7 on at least one side thereof. Through a supply conduit F the underside of said membrane can be supplied with a pressurized medium, for instance a hydraulic liquid or pressurized air. Between themselves the press plates 5, 6 and/or the end plates are in pairs forming pressure chambers 8. In each pressure chamber 8 there are arranged two filter cloths 9. Outside the filter cloths, the walls of the pressure chambers exhibit drain channels 10 arranged in the plates 3-6 and the membrane 7 respectively, said channels through conduits 12 being connected to holes passing through the plates. Also between the press plate 5 and the membrane 7 there are arranged distribution channels 16 corresponding to the drain channels 10 for said pressurized medium. Some of the holes connect with conduits B, E for separated liquid, while other conduits C, D serve both as outlet for separated liquid and as inlet for pressurized gas, as will be explained in detail below.

The filter cloths 9 are sewn together at the top and fastened to suspension bars 18. Furthermore, the filter cloths 9 exhibit feed port fixtures 20 which, when the plates 3-6 are brought together, sealingly connect to a feed supply conduit A. The feed port fixture exhibits passages 22, which connect the feed supply conduit A with respective pressure chamber 8. The suspension bar is suspended by two pulling wire ropes 24 connected at the other end with wire rope drums 26. The wire rope drums are non-rotary and axially movably arranged on two hexagonal shafts 28 connected to a lifting and descending motor. At their lower ends the filter cloths pass guide members 30 and then the filter cloths are two and two rolled onto spring-loaded cloth rollers 32 similar to a roller blind roller. Furthermore, there are pipe-shaped members 34 constituting supply means G for washing liquid and exhibiting nozzles 36 intended for spraying washing liquid onto the obliquely opposed filter cloth 9. The guide members 30, cloth rollers 32 and the pipe-shaped member 34 are arranged to simultaneously being brought along during movements with the press plates 5, 6 and the movable end plate.

Figure 4:
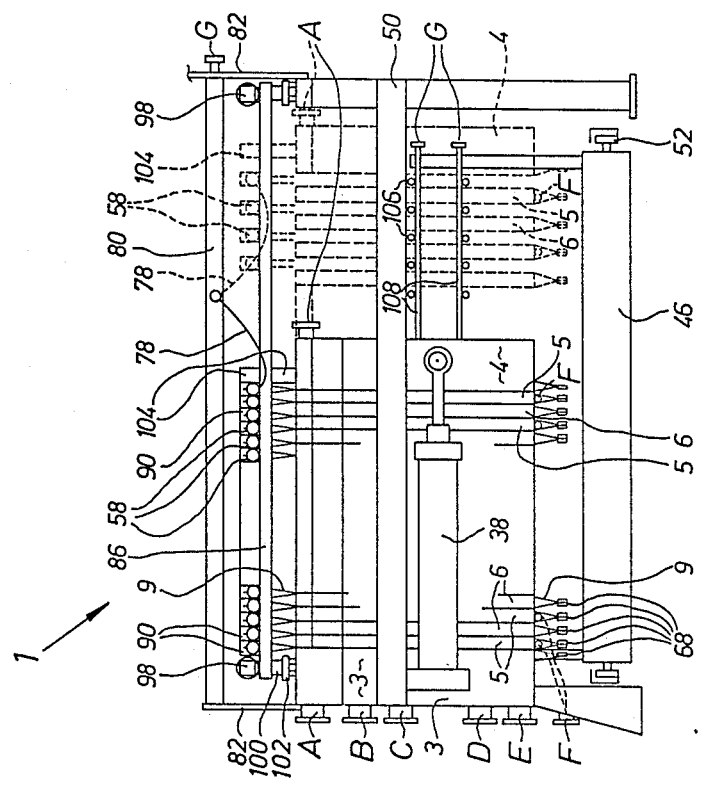

The function of the press filter is as shown in FIG. 4, the press plates 5, 6 and the movable end plate 4 are initially brought together with the aid of at least one hydraulic cylinder 38. Then a for moisture removal intended suspension of solid particles in a liquid, for instance a water suspension of ore concentrate with 65% solids is introduced through the feed supply conduit A and the passage 22 of respective feed port fixture 20 in between the two filter cloths 9 of each pressure chamber 8, said filter cloths forming a filter element. The suspension is introduced under high pressure, for instance 4 bars. The main portion of the liquid is already now driven through the filter cloths and the moisture is already at this stage reduced; for ore concentrate to 86-88% solids. When the pressure chambers have been filled the suspension is removed from the feed supply conduit A by flushing with pressure air and clean liquid. A pressurized medium is now introduced through a supply conduit F between the press plates 5 and the membranes 7, such that the membranes compress the filter cakes 40. In doing so, the moisture content is further reduced in the filter cake. During these process stages the separated liquid is removed through both the outlets B, E and the combined inlets and outlets C, D. After that the membranes are relieved from pressure and a pressurized gas, for instance pressure air, is introduced through the inlets C, D and blown through the filter cakes under continued reduction of the moisture content. In this way a maximally demoisturized filter cake is produced, which for an ore concentrate typically may contain a remaining moisture content of for instance 6.0-6.5% water.

When the moisture removal is finished the press plates 5, 6 are brought away from each other by means of the hydraulic cylinders 38, such that gaps 44 defined by distace limiting means are created therebetween. The filter cloths are lowered through the bottom gap by unrolling the pulling wire ropes 24 from the rope drums 26. The spring-loaded cloth rollers 32 are then rolling up the lower portions of the filter cloths and are holding the filter cloths tensioned. The filter cakes formed are released from the filter cloth at the passage of the guide members 30. When the filter cake removal is finished the filter cloths are lifted up again. The filter cloths are cleaned at least periodically by bringing a drip pan 46 (FIG. 5) under the filter press 1 and introduce washing liquid as obliquely upwardly directed spray jets 48 during a repeated lowering of the filter cloths. Only one of the filter cloths 9 in each chamber can be washed at the same time, since the spray jets 48 otherwise would interfere with each other.

This previously known system for filter cloth suspension and filter cake removal has several drawbacks. In spite of the washing there occur obstacles and other troubles during the rolling up of the cloth on the cloth rollers because of remaining particles on the filter cloths. Furtheron, the rinsing and cleaning effect is unsatisfactory since the washing liquid is spread on in an upward direction, and consequently directed in counter-current to the washing liquid leaving the filter cloths. Other drawbacks with the spring-loaded cloth rollers is a big building height of the machine, a mechanically vulnerable design and that long time periods have to be spent for cloth change and repair. Changes are quite frequent, since holes in the filter cloths often occur during operation. Also the arrangement of wire rope durms on hexagonal shafts is connected with disturbances, for instance derailment of the wire ropes. This design is also contributing to increased building height. However, the most important drawback connected with this design is that the repeated lifting and lowering of filter cloth for filter cake removal and filter cloth cleaning considerably contribute to a long cycle time for this previously known pressure filter and consequently to a low production capacity.

The object with the present invention is, therefor, to bring about a method and a means for pressure filtering of the kind described above, which gives a faster cycle time for the filtering operation, an improved cleaning of the filter cloths by concurrent washing and a reduced time consumption for filter cloth changes and other repairs. Further, the inventive pressure filter shall have a lower building height, a more simple construction with a smaller amount of moving parts and generally given an improved and more economic press filter construction.

By the fact, that according to the invention, the suspension means of the filter cloths are longitudinally movably supported separate from the press plates by guide rails being possible to vibrate instead of by protruding, hinged brackets, it is possible to discharge the filter cakes in all the filter chambers at the same time with short cycle times. By vibrating the filter cloths with the aid of the guide rails it is possible to achieve a fast and effective filter cake discharge without the need of any time consuming lowering and rising movements of the filter cloths.

By spraying washing liquid on the filter cloths in this way for cleaning thereof, it is possible to further reduce the cycle times. By cleaning the filter cloths in this way according to the invention it is no longer necessary to lower the filter cloths for cleaning as described above for the most pertinant Prior Art. Compared to a travelling cleaning device as described in German Patent Publication No. 3.527.735 the time gains are of course even greater.

According to an advantageous embodiment of the invention the filter cloths are cleaned by spraying washing liquid thereon through nozzles arranged on pipelike means being insertable between the filter cloths. Spray nozzles may also be arranged on pipelike means along the sides of the plates and/or pipelike suspension means for the filter cloths. In this way a fast cleaning of the filter cloths is achieved at the same time as washing liquid is sprayed on in concurrent with the flow of washing liquid leaving the filter cloths.

According to a further advantageous embodiment of the invention the filter cloths are tensioned, and/or loaded by weights affixed to those parts of the filter cloths protruding underneath the press plates, preferably by rods introduced in the bottom hem of the filter cloths.

According to another advantageous embodiment of the filter cloths are tensioned with the aid of spring means, preferably helical springs or rubber bands affixed to the parts of the filter cloths protruding underneath the press plates.

By the use of these two alternative filter cloth tension means the need for vulnerable and mechanically complicated spring-loaded cloth rollers of roller blind-type is eliminated.

By the use of the measures described above it has been possible to reduce the cycle time for the filter cake removal and washing of the filter cloth about 40%.

According to a further advantageous embodiment of the invention situated on each side of respective press plate, the two filter cloths are connected with each other underneath said press plate, said filter cloths exhibiting tension and loading means connected to each other and/or common tension and loading means. In this way there is no longer any need for separate guide means 30 for preventing the parts of the filter cloths hanging underneath from hindering the filter cake discharge.

According to further advantageous embodiments of the invention the two filter elements forming filter cloths in each pressure chamber are made in one piece and are freely hanging over their suspension means separated from each other, exhibit one half each of a feed port fixture with passages to respective pressure chamber, and exhibit positioning aiding means, such as holes provided with eyelets, co-operating with positioning means arranged on the filter cloth suspension means. These arrangements together with the arrangements mentioned above at the lower ends of the filter cloths contribute to a reduced time consumption for filter cloth exchange. It has been possible to reduce this time from about half an hour to only two minutes.

Further favourable features of the invention are disclosed in the following description.

Figure 5:
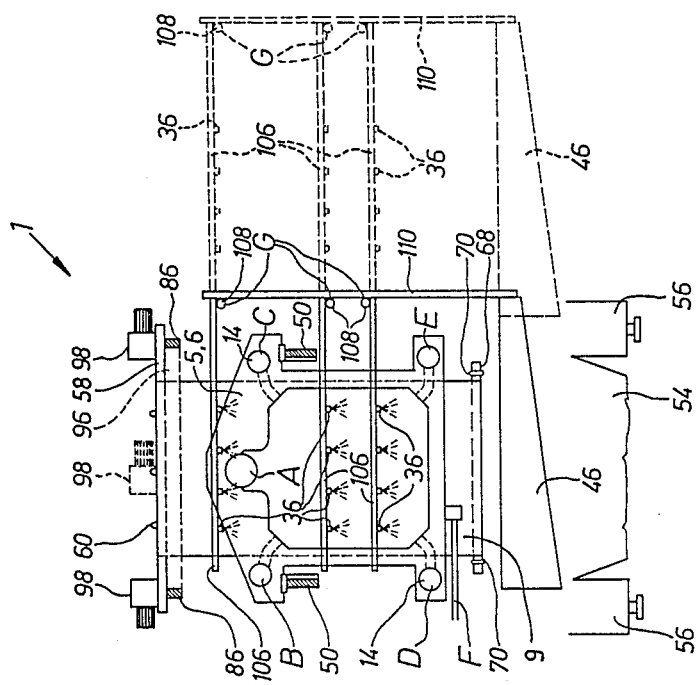
Figure 6:
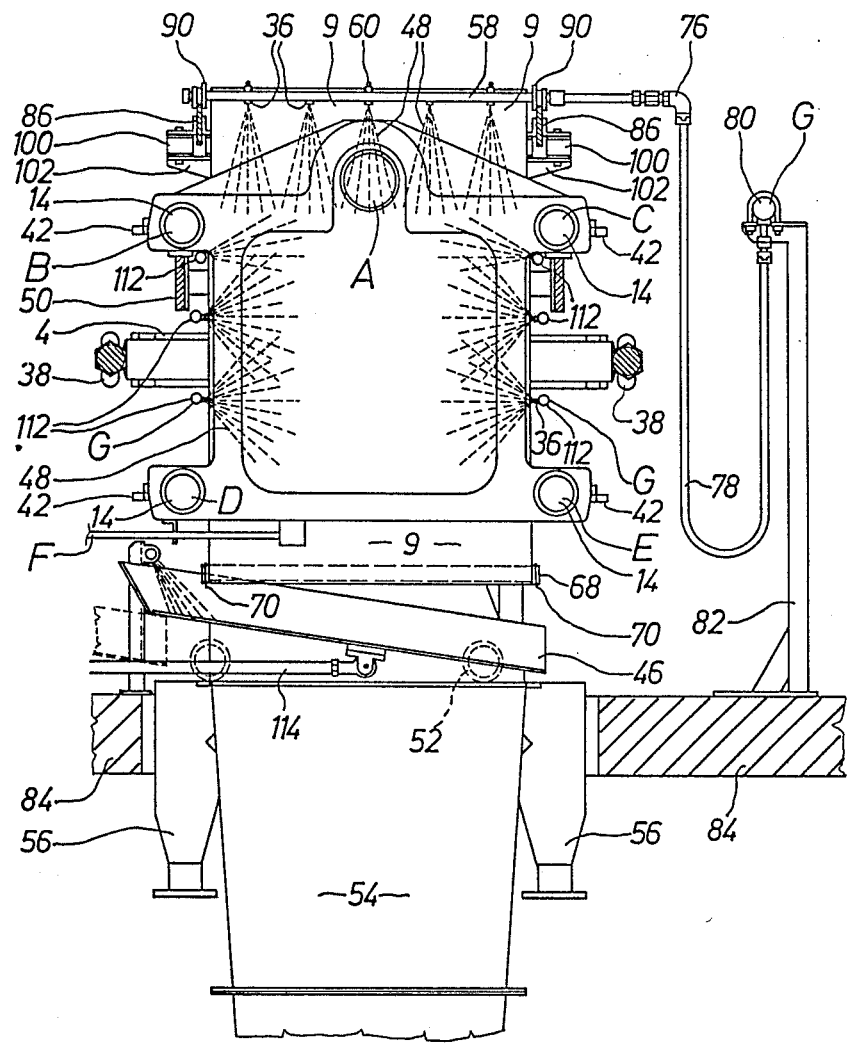

The invention will now be described in detail with the aid of explanatory examples and with reference to the attached drawing. In order to make the drawing more easily understandable the figures are made substantially to schematic form, and features irrelevant to the invention have been excluded. In the figures shows:

FIG. 1 is a partial sectional view of a previously known press filter during filtering exhibiting a lifting and lowering means, FIG. 2 a section corresponding to the section of FIG. 1 showing the same filter press during a filter cake discharge sequence and also exhibiting cloth uprolling means and guide means for filter cloths, FIG. 3 a section corresponding to FIG. 2 showing the washing of the filter cloths, FIG. 4 a schematic elevated view of a press filter according to the invention in open and closed position, FIG. 5 a cross-sectional view of the press filter of FIG. 4 in open position, the filter cloth being removed in the sectional plane shown, FIG. 6 a view corresponding to FIG. 5 of an alternate embodiment of a press filter according to the invention, FIG. 7 a schematic, partial cross section through a press filter according to the invention showing filter cloth suspension, feed port fixtures for a particle suspension and the lower portion of the filter cloths in closed position, FIG. 8 a sectional view corresponding to FIG. 7 in open position also showing a vibrator, and FIG. 9 a partial cross sectional view showing a guide rail for the filter cloths suspension means with appending console.

Referring now to FIG. 4, there is shown a general side view of an inventive press filter 1 comprising a frame, a stationary end or head plate 3, a movable end or head plate 4, and intermediate press plates 5, 6.

The movable press plates 5, 6 and the movable head plate are slidably mounted on guide bars 50 of the frame and are possible to bring apart and together respectively with the aid of two double action hydraulic cylinders 38. The end or head plates 3, 4 and the press plates 5, 6 exhibit distance limiting means 42, shown only in FIG. 6, in the form of roller chains, said distance limiting means being used for bringing apart the plates and limiting the distance therebetween when the press filter is opened. Under the press filter there is a drip pan 46 which is removable on guide and run rolls 52 or slide rails. Under the press filter there is a receiving opening 54 for dried material and two collecting launders 56 for washing liquid and particles washed away.

On the frame and the stationary end or head plate there are connections for inlet conduits as well as outlet conduits A, B, C, D, E, F. The inlet connection F is connected to connections F on the membrane-provided press plates 5 through flexible tubing, not shown in detail. The construction of the end or head plates 3, 4, the press plates 5, 6 and the membranes 7 coincide with the previously known technique as described above and as shown in FIGS. 1–3.

The arrangement and suspension of the filter cloths 9 are best shown in FIGS. 7 and 8 showing partial sections through the press plates as well as the filter cloths and their suspension means. The press plates 5, 6 including their membranes are only shown by their outside contour. In each pressure chamber 8 there are two substantially vertical filter cloths 9 which are forming a filter element. The cloths are made in one piece and are suspended over a pipelike suspension rod 58. The position on the suspension rod 58 of the two cloths is fixed by protrusions 60 which are engaging holes in the filter cloths provided with eyelets 62 (see FIG. 9). This fixation of the position is necessary, because the two filter cloths 9 are not sewn together with each other at the top. The feed port fixture 20 of the filter cloths is separated in two separate halves 20' and 20" respectively, which are affixed to one each of the filter cloths in level with the feed supply conduit A of the press plates. By this arrangement it is possible to separate the two halves 20', 20" and consequently the filters cloths 9 from each other, when the press plates 5, 6 are brought apart. In the through flow passages 22 of the feed port fixtures the two halves exhibit distance strips 64 intended to prevent the feed port fixture to be compressed together by membrane pressure or pressure from flowing-through air. The distance strips may be arranged right opposite each other as shown in the figures, or alternatively be arranged at the side of and overlapping each other, in which case they in closed positions are abutting the opposite wall 66 of respective feed port fixture half 20', 20".

The parts of the filter cloths 9 protruding under the lower edge of the press plates in their lower hem have introduced through-rods 68. With the aid of their weight they load the filter cloths and keep them tensioned. As shown in FIG. 6, the rods 68 belonging to the cloths on each side of respective press plate 5, 6 are connected in pairs with each other at each end by connecting means, such as rubber bands 70 arranged in grooves. Because the rods are held together in pairs no special guide members 30 are required for keeping the filter cloths 9 apart during the filter cake discharge and the filter cloth wash. In order to further improve the filter cloth tension and the loading of the filter cloths 9 elastic spring means may be arranged on the rods 68. An example is shown in FIG. 8 in the form of a helical spring 72 affixed to a console 74 protruding downwards from the associated press plate. Such elastic means prevent the rods and the lower parts of the cloths from swinging sidewards.

The parts of the filter cloths 9 protruding under the press plates 4, 5 and their rods 68 may also be free from each other. The thickness of the suspension rods 58 will bring them apart when the press plates are separated. Therefor, relatively thick suspension rods are preferred. During vibration, as described below, the rods will jump and jerk, thus stetching and cracking the filter cloth and removing the filter cake therefrom. The free lower ends also provide for a very fast filter cloth exchange, especially if all filter cloths are exchanged at the same time as described below.

The suspension rods 58 are pipe-shaped and are provided with downwards directed spray nozzles 36 for washing liquid introduced through a supply conduit G. At one of the ends they have a connection 76 which via a flexible hose 78 connects to a distribution pipe 80 (see FIG. 6). The pipe 80 is supported by posts 82, which are anchored to the the near-by floor or the like 84.

The suspension rods 58 are supported movably in the longitudinal direction of the filter press on guide rails 86. In order to reduce the friction they may be provided with ball bearings 88 or other bearings. In order to position the suspension rods 58 with their protrusions 60 directed upwards they exhibit rectangular guide or distance plates 90 which are abutting guide lists 92. The plates 90 are also defining the positioning of the supsension rods 58, when the press plates are in their closed position. The various suspension rods 58 are linked together by distance means 94 which are defining the distance between the suspension rods, when the press plates are situated in open or brought apart position. In the embodiment shown the distance means 94 comprise roller chains, of the bicycle chain type, but they may also comprise other flexible and/or articulated means.

The guide rails 86 are supported at both ends by vibration dampers 100 and consoles 102, which are connected to the frame in appropriate way. The two guide rails 86 are provided with at least one vibrator 98, preferably one at each end. According to a first embodiment, each guide rail may be provided with at least one such vibrator and the guide rails are vibrated independently. According to a second embodiment, the two guide rails 86 are connected at the ends by two yokes shown with dashed lines 96 in FIGS. 5 and 8, thus forming a frame. One at least one of the yokes there is provided a vibrator 98 for vibrating the guide rails in unison.

The suspension rod 58 situated closest to the movable end or head plate is through the distance or connection means 94 connected to the movable plate 4, for instance with posts 104 protruding from said plate and shown only in FIG. 4. Said posts 104 comprise abutment surfaces for abutting the guide and distance plates 90 of the nearest suspension rod 58. Consequently, with the aid of the post 104 the suspension rods 58 and, consequently, the filter cloths 9 can be brought to follow the press plates 5, 6 in their movements when the press plates are brought apart and together.

For the cleaning of the filter cloths there are provided pipe-like means 106 and, preferably, downwardly directed spray nozzles 36 connected to distribution pipes 108 which in turn are connected to a supply conduit G for washing liquid. The distribution pipes 108 and the pipelike means 106 are fastened to posts 110 which are protruding from the drip pan 46 and are following the drip pan in its movements. In this way it is possible to at the same time as the drip pan is moved in below the press filter introduce the pipelike means 106 with its spray nozzles between the filter cloths 9 in each pressure chamber 8 for spray cleaning of the filter cloths. It is possible to arrange an arbitrary amount of pipelike means 106 at different levels in order to achieve a desired or necessary clean-washing effect. It is possible to provide downwardly directed spray jets 48 of washing liquid for concurrent washing, but also spray jets directed sideways or upwardly if one wishes to do this. Alternatively, the pipelike means 106 may be affixed to separate guide and run rolls or sliding rails and be moved independent of the drip pan 46.

Referring now to FIG. 6 pipelike means 112 with substantially sideways directed spray nozzles 36 can be also arranged along the sides of the plates. The pipelike means are connected to a supply conduit G for washing liquid and can distribute such washing liquid on to the filter cloths 9 from the sides, when the press plates are in their open or brought apart position. Of course, it is possible to combine one or several of the above described ways of washing the filter cloths 9 with washing liquid; viz. by spray nozzles 36 arranged on the pipelike suspension rods 58 for the filter cloths and or arranged on pipelike means 106 insertable between the filter cloths and/or arranged on pipelike means 112 arranged along the sides of the plates.

The function and the working mode of the inventive filter press are as follows: Initially, the press plates 5,6 and the end or head plates 3,4 are brought together, then a suspension of fine particles in a liquid is introduced and is demoisturized as described above for the previously known technique with reference to FIGS. 1–3. When the demoisturizing is finished the plates are brought apart by the hydraulic cylinders 38. Simultaneously, with the aid of the distance limiting means 94 the suspension rods 58 are brought to take central positions over the intermediate gaps 44 created between the plates of the filter press. The filter cloths 9 are brought apart from each other by the tension and loading effect of the weight of the rods 68 and/or separate spring means, such as helical springs 72 or rubber bands. After that, the guide rails 86 are vibrated during a short time period in vertical direction by the vibrators 98. The guide rails in their turn vibrate suspension rods 98 with the filter cloths 9, thus the filter cakes 40 swiftly and completely are disengaged from the filter cloths 9 and fall down through the receiving opening 54. Next, the drip pan 46 is pushed over the receiving opening 54 by an hydraulic cylinder 114, at the same time as possibly provided pipelike means 106 are inserted between the filter cloths 9 in respective pressure chamber 8. After that, the filter cloths 9 are washed clean from solid particles by spraying with liquid from the spray nozzles 36. At the end of the washing, the filter cloths are subjected to another short vibration by the vibrators. In this way, the filter cloths are relieved from most of the washing liquid, and this is prevented from dripping down into the receiving opening 54. After the washing, the pipelike means 106, if any, are removed and the plates of the press filter are brought together again. A new filtering cycle can begin.

According to a especially favourable embodiment of the invention, the guide rails 86 are connected at their ends by yokes 96 to form a frame, said frame being disconnectable from its flexible and resilient suspension means 100. This makes it possible to remove and exchange the entire filter cloth package comprising said frame, with all the suspension rods 58 and their filter cloths 9. All that is needed is to open the press filter and disconnect the power supply means for the vibrating means and the flexible connection conduits 78 for washing liquid to the pipelike suspension means 58. Then the rods 68 at the lower end of the filter cloth 9 are disconnected from each other and from the spring means 72 if such are provided. In this case it is especially favourable if the rods 68 are free from each other as described above. After the disconnection of the guide rails from the flexible vibration dampers 100 the entire package can be lifted out. In order to facilitate the lifting out and replacement of the frame with the filter cloths vertical guide means (not shown) may be inserted in holes in the end or head plates 3, 4 and pass through suitable guide rings arranged in the frame formed by the guide rails and the yokes. In this way the filter cloths 9 can be exactly guided in between the respective gaps 44 between the press plates.

In this way it is possible to replace the entire filter package for an exchange unit. This is especially favourable when there is a need for a periodical cleaning of all filter cloths. This is the case in some chemical and industrial processes where a chemical precipitation may occur in the filter cloths. The entire package can then be placed in a bath and treated with suitable solutions for dissolving the precipitates. In the meantime the press filter is working at full capacity with the exchange unit.

The invention is not limited to the embodiments described above and shown in the figure, but can be modified in many various ways within the limits of the inventive concept and the following patent claims.

What we claim is:

1. A method for filtering on a press filter (1), which comprises a number of press plates (3, 4, 5, 6), which can be pressed against each other and are provided with drain conduits (10, 12), said press plates two and two between themselves forming at least one pressure chamber (8), two substantially vertical filter cloths having suspension means (18) being suspended in each pressure chamber (8), and means to introduce a suspension of solid particles in liquid into each pressure chamber (8) to cause the liquid to pass through the filter cloths (9) and to be evacuated through said drain conduits, the solid particles remaining in each pressure chamber, said particles forming a filter cake (40) between the two filter cloths, comprising the steps of:

separating the press plates, and discharging the filter cake from said pressure chamber (8), the filter cloths (9) being vibrated during said discharge, moving said filter cloths (9) with their suspension means (58) in a horizontal direction during the pressing against each other and the bringing apart of said press plates, and during the filter cake (40) discharge, vibrating all of the filter cloths (9) and their suspension means (58) simultaneously.

2. A method according to claim 1, including the steps after the filter cake is discharged of spraying a washing liquid over the filter cloths through nozzles and vibrating the filter cloths during the spraying with washing liquid.

3. In an apparatus for pressure filtering in a press filter (1) for the removal of liquid from a suspension of solid particles in said liquid, said press filter comprising a number of press plates (3, 4, 5, 6), which can be pressed against each other and are provided with drain channels, said press plates two and two between themselves forming at least one pressure chamber (8), two substantially vertical filter cloths (9), suspension means (18) for suspending two filter cloths in each of said pressure chambers (8), a feed supply conduit to introduce said suspension under pressure between the filter cloths (9) in said pressure chamber (8), said liquid being removed under the influence of the inlet pressure, through the filter cloths (9), and through the drain channels (10, 12) of the press plates, while the solid particles in the form of filter cakes (40) remain between the filter cloths (9), and means to separate the press plates (3, 4, 5, 6) to discharge the filter cakes from the pressure chambers (8), the improvement wherein said press filter further includes:

guide rails supporting said suspension means (58) of the filter cloths (9) at both ends for horizontal movement in the longitudinal direction of the press filter, said guide rails being resiliently suspended, and vibration means (98) for simultaneous vibrating of all suspension means (58) with appending filter cloths (9), and distance means (94) affixed to the ends of said suspension means, said distance means connecting the suspension means with each other and with the press plates.

4. Apparatus as claimed in the claim 3, including guide plates on said suspension means and guide surfaces engaging said guide plates, said suspension means (58) being prevented from turning around their longitudinal axes by said guide plates (90) and said guide surfaces (92), when the press plates (3, 4, 5, 6) are brought together, the positions of the suspension means (58) being defined by the guide plates (90).

5. Apparatus as claimed in the claim 3, wherein said vibration means vibrate said guide rails (86) in substantially vertical direction.

6. Apparatus as claimed in claim 3, wherein the bottom parts of said filter cloths extend downwardly beyond the lower end of said pressure chambers and include means for tensioning of the filter cloths (9) affixed to said bottom parts of the filter cloths.

7. Apparatus as claimed in claim 3, wherein the two filter cloths (9) in each pressure chamber (8) are hanging from opposite edges of their suspension means (58) separated from each other to accommodate therebetween a feed port fixture (20) with passages (22) to the associated pressure chamber (8).

8. Apparatus as claimed in claim 3, including movable pipe means (106) having nozzles (36) and a supply conduit (G) for washing liquid, said means (106) having mounted thereunder a movable drip tray (46) for following it in its movements; said means (106), when the press plates are brought apart, being insertable in said pressure chambers (8) between the two filter cloths (9) in order to clean said filter cloths.

9. Apparatus as claimed in the claim 3, wherein said suspension means of the filter cloths are pipe means (58) having downwardly directed nozzles (36) and connections to a supply conduit (80) for washing liquid, said apparatus including second pipe means (112) having connections to a supply conduit (G) for washing liquid and nozzles (36) along the sides of the press plates.

10. Apparatus as claimed in the claim 3, including yokes connecting said guide rails (86) at their ends to form a frame, said frame being disconnectable from its resilient suspension means (100) and said vibrating means (98), said frame being removable for repair or cleaning as a unit together with all the suspension means (58) and filter cloths (9) for repair or cleaning of the filter cloths (9) or exchange for similar replacement unit.

* * * * *

UNITED STATES PATENT AND TRADEMARK OFFICE
CERTIFICATE OF CORRECTION

PATENT NO. : 4,900,454
DATED : February 13, 1990
INVENTOR(S) : Hans-Goran Hedlund; Lennart Backstrom It is certified that error appears in the above-identified patent and that said Letters Patent is hereby corrected as shown below:

```
Col. 1, line 9, after "cloths", insert --in--;
Col. 1, line 60, after "frame", delete "2";
Col., 3, line, 4, "distace" should be --distance--;
Col. 4, line 24, after "embodiment", delete "of";
Col. 6, lines 63-64, "supsension" should be
--suspension--.
```

Signed and Sealed this

Eighth Day of January, 1991

Attest:

HARRY F. MANBECK, JR.

*Attesting Officer*   *Commissioner of Patents and Trademarks*